United States Patent

Bisping et al.

[11] Patent Number: 5,288,162
[45] Date of Patent: Feb. 22, 1994

[54] EXPANSION DOWEL

[75] Inventors: Heinz Bisping, Augsburg; Horst Goetzfried, Igling; Franz Popp, Buchloe; Wolfgang Hausner, Igling; Helmut Mirsberger, Munich, all of Fed. Rep. of Germany

[73] Assignee: Hilti Aktiengesellschaft, Furstentum, Liechtenstein

[21] Appl. No.: 904,105

[22] Filed: Jun. 24, 1992

[30] Foreign Application Priority Data

Jun. 25, 1991 [DE] Fed. Rep. of Germany ....... 4120857

[51] Int. Cl.⁵ .............................................. F16B 13/00
[52] U.S. Cl. ............................. 403/408.1; 403/405.1; 403/277; 411/57
[58] Field of Search .............. 403/405.1, 408.1, 406.1; 411/57, 62

[56] References Cited

U.S. PATENT DOCUMENTS

| | | | |
|---|---|---|---|
| 1,619,569 | 3/1927 | Dedouch | 411/57 |
| 3,516,324 | 6/1970 | Berner | 411/57 |
| 4,142,440 | 3/1979 | Schefer | 411/57 |
| 4,874,276 | 10/1989 | Iguchi | 403/408.1 |

Primary Examiner—Randolph A. Reese
Assistant Examiner—Anthony Knight
Attorney, Agent, or Firm—Anderson Kill Olick & Oshinsky

[57] ABSTRACT

An expansion dowel is formed of an axially elongated expansion member and an expansion element insertable into a bore through the expansion member. The expansion member has two axially extending first slots located diametrically opposite one another and open at one end of the member. Two axially extending second slots are located in the expansion member offset circumferentially by 90° from the first slots. The second slots are closed at their opposite ends. The first and second slots partially overlap in the axial direction, so that the expansion member is radially expandable in the overlapping region of the slots, while the expansion element is prevented from moving off center during the expanding operation.

4 Claims, 2 Drawing Sheets

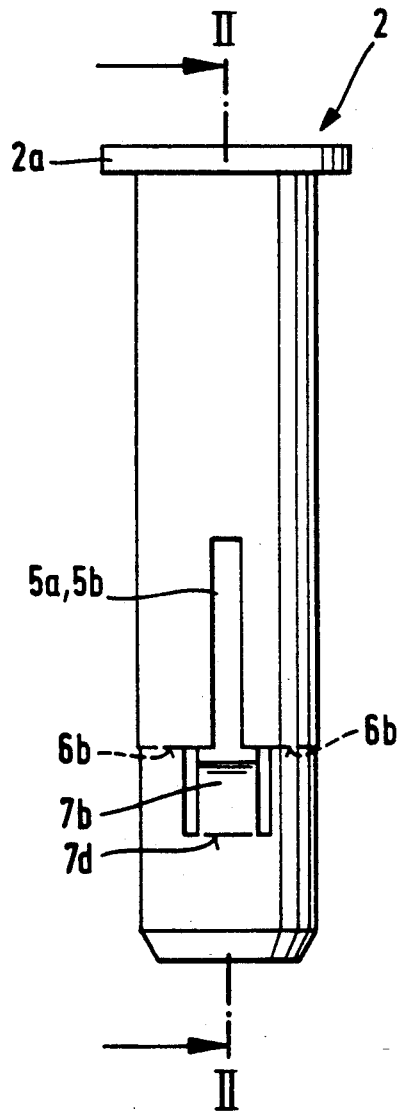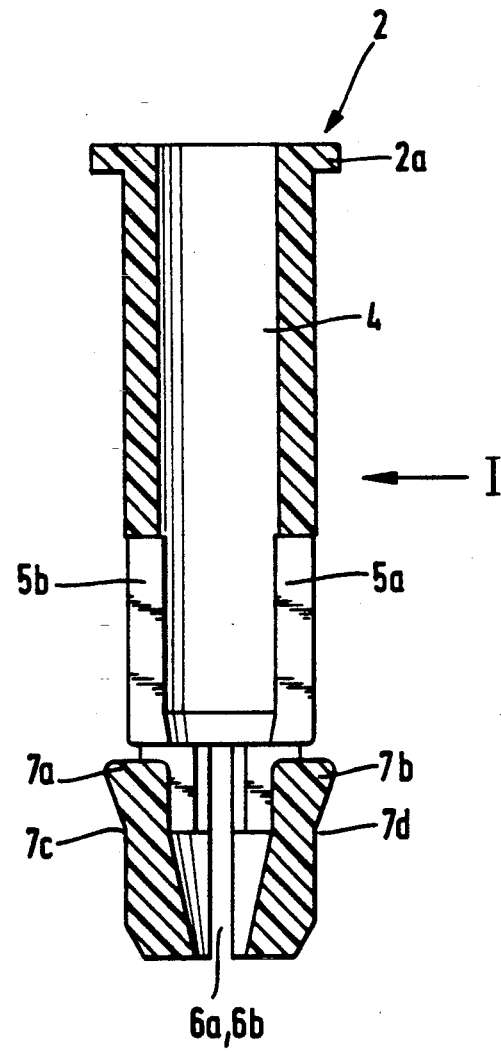

EXPANSION DOWEL

BACKGROUND OF THE INVENTION

The present invention is directed to an expansion dowel made up of an expansion member radially widenable by an expansion element. The expansion member has a through bore and two axially extending first slots open at the leading end of the expansion member and two axially extending second slots closed at the opposite ends. The second slots are offset in the circumferential direction by 90° relative to the first slots.

An expansion dowel is disclosed in DE-OS 3 917 498 and has two open and two closed axially extending slots located on both sides of a central bore. The closed ended slots are offset through 90° with respect to the open ended slots and the slots are arranged one after the other. To anchor an expansion dowel of the above type, the expansion element is driven in the insertion direction into the central bore of the expansion member. Due to a smaller cross-section of the central bore in the region of the axially extending slots, a radially expansion of the expansion member takes place and, at the same time, there is a compaction of the material of the expansion member. When the expansion element is driven in, it tends to run off center in the region of the slots, so that the expansion element is located in the expansion member obliquely of the axial direction at the end of the driving operation. Accordingly, the slots in the known expansion member are arranged one after the other and offset 90° relative to one another. This arrangement affords a centering of the expansion element in the expansion member.

Since the transition region between the slots cannot be widened radially, bracing of the expansion member within the central bore cannot be attained. Due to the high material compaction occurring when the expansion element is driven in, there is the danger that the leading end region of the expansion member, where the axially extending open ended slots are located, is torn off.

SUMMARY OF THE INVENTION

Therefore, it is the primary object of the present invention to provide an expansion dowel which avoids the above disadvantages and can be manufactured economically.

In accordance with the present invention, the axially extending closed ended slots partially overlap the open ended axially extending slots in the axial direction.

Because of the overlap afforded by the present invention, the transition region between the slots is radially widenable. Any break-off or fracture of the expansion element in the sidewise direction is prevented by the axial overlap of the slots.

Preferably, the length of the overlap amounts to 0.3 to 1 times the axial length of the closed ended slots. The length of the overlap can be selected based on the diameter of the expansion element and the cross sectional area of the central bore in the region of the axially extending slots. If the cross sectional area of the central bore is relatively small and the diameter of the expansion element is large, it is advantageous to make the length of the overlap relatively large.

Radially displaceable projections extending for a part of the length of the axially extending slots are preferably located in the closed ended slots with the projections extending radially outwardly from the outside of the expansion member. The projections are connected with the expansion member through a bending or pivoting region. Prior to inserting the expansion member in a bore hole, the projections extend radially outwardly beyond the outside surface of the expansion member. When the expansion member is inserted into the bore hole, the projections are pressed radially inwardly. As a result, a cross sectional area reduction in the central bore in the expansion member is achieved in the region of the projections. When the expansion element is driven into the expansion member its leading end contacts the projections extending into the central bore. If an additional driving force is applied, such as blows, the force is transmitted from the expansion element through the projections to the expansion member, whereby an axial movement of the expansion member within the bore hole takes place with the expansion member contacting the base of the bore hole and, as a result, this axial movement is effected without any premature expansion of the expansion member. If the trailing end of the expansion member is equipped with a radially outwardly extending flange, then the driving operation continues until the flange contacts the surface of the structural component into which the expansion dowel is inserted.

By applying a higher driving force, the projections within the central bore are pressed radially outwardly against the surface of the bore hole by the leading end of the expansion element, so that an additional anchoring of the expansion dowel in the bore hole is attained.

Preferably, the projections pivot around a pivot axis extending perpendicularly of the axis of the slot. With such pivot axes, the projections pivot transversely of the axial direction of the expansion member and penetrate into the surface of the bore hole in a barbed-like manner.

In a preferred arrangement, the pivot axes are located at the leading end region of the closed ended slots. The parts of the projections which extend radially outwardly from the outside surface of the expansion member, extend inwardly into the slots and are radially displaceable. If a force acting opposite to the insertion direction acts on the anchored expansion member, the projections dig progressively further into the surface of the bore hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an elevational view of an expansion member of an expansion dowel embodying the present invention;

FIG. 2 is an axially extending sectional view of the expansion member of FIG. 1 taken along the line II—II;

DETAILED DESCRIPTION OF THE INVENTION

Figure 3:
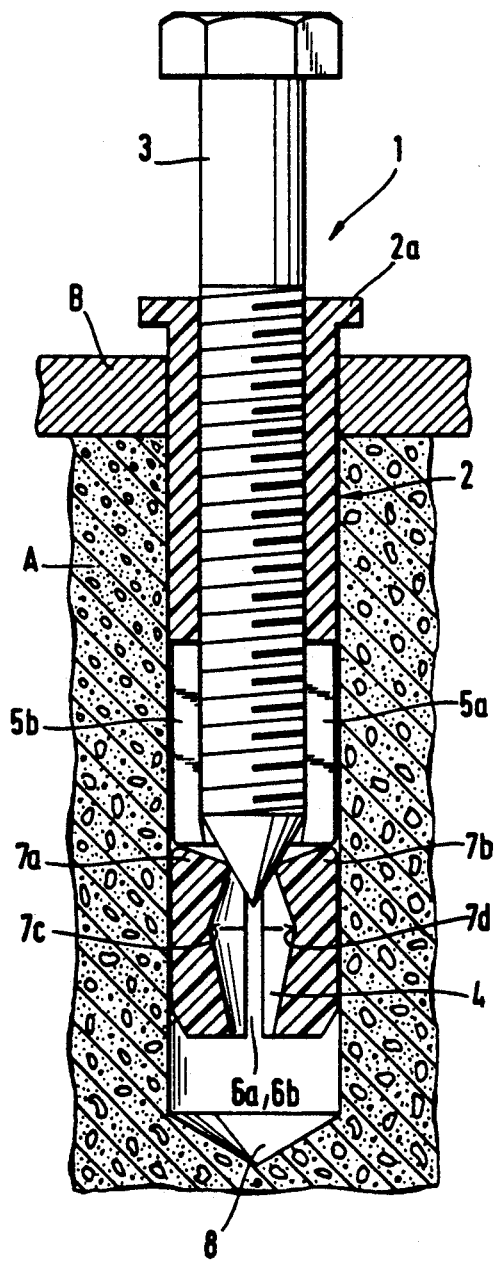
FIG. 3 is an elevational view of the expansion dowel with the expansion member of FIG. 2 shown in section and with the dowel inserted into a bore hole in a concrete structure.

In FIGS. 1 and 2 a sleeve-like expansion member 2, forming part of an expansion dowel 1, is expandable by an expansion element 3, see FIG. 3. As viewed in the drawings the lower end of the expansion member and the expansion element is the leading end and the upper end is the trailing end. The expansion member 2 has a central bore 4 extending between its leading and trailing ends and axially extending first slots 6a, 6b are open at the leading end and extend toward the trailing end. The first slots 6a, 6b are diametrically opposite one another. Two axially extending second slots 5a, 5b are located in the expansion member closer to the trailing end and the second slots are offset in the circumferential direction by 90° relative to the first slots 6a, 6b. The central bore 4 has a smaller cross-sectional area in the region of the first and second slots 6a, 6b; 5a, 5b. The second slots 5a, 5b axially overlap the first slots 6a, 6b.

A flange 2a is located at the trailing end of the expansion member and projects radially outwardly from the outside surface of the expansion member 2. A radially displaceable projection 7a, 7b is located in each of the second slots 5a, 5b, and each projection has a pivot axis 7c, 7d extending transversely of the axis of the expansion member 2 approximately perpendicular of the axis. The projections are located at the leading ends of the second slots 5a, 5b. While the expansion element is driven into the expansion member, due to the overlap of the second slots 5a, 5b with the first slots 6a, 6b, it is assured that the expansion element 3 is centered within the expansion member 2.

As shown in FIG. 3, the expansion dowel 1 has the expansion element 3 in the form of a screw and the expansion member 2 is as displayed in FIGS. 1 and 2. In FIG. 3, the expansion dowel is inserted into a bore hole formed in a structural member A. When the expansion member is inserted into the bore hole, the projections 7a, 7b are pressed radially inwardly with a resulting cross-sectional area reduction taking place in the central bore 4. As the expansion element 3 moves through the bore 4, its leading end contacts the inwardly extending projections 7a, 7b and, if an additional axially directed driving force is applied, an axial movement of the expansion member 2 is effected until the flange 2a at its trailing end comes into contact with the surface of the element B to be fastened to the structural member A by the dowel. When the expansion member 2 has its flange in contact with the element B, further inward driving of the expansion element presses the projections 7a, 7b radially outwardly against the surface of the bore hole. The expansion element 3 may be a screw or a nail or a drive screw as shown in FIG. 3.

Figure 4:
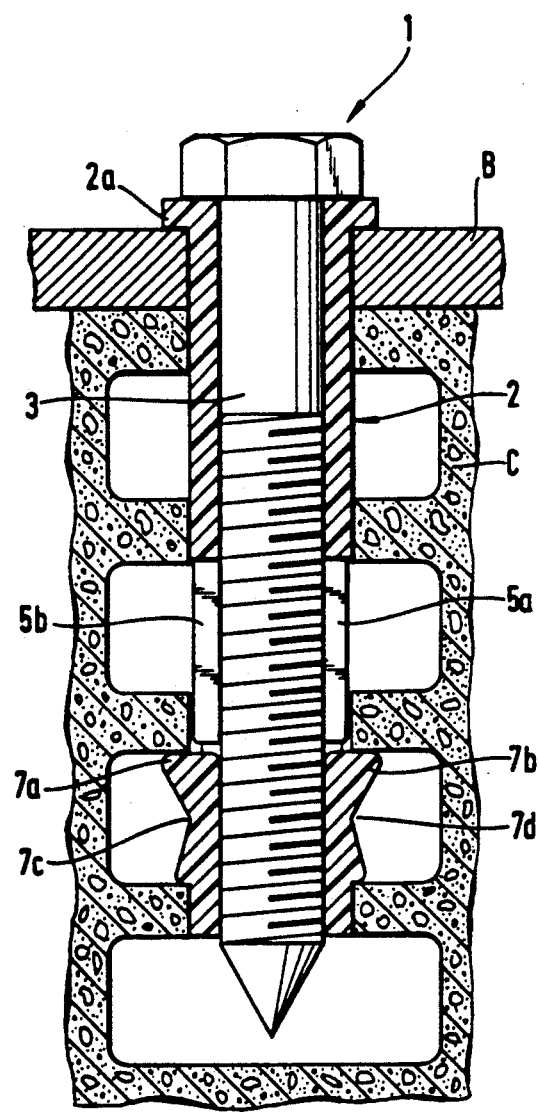
FIG. 4 is a view, similar to FIG. 3, with the expansion dowel completely inserted into a concrete structure containing cavities.

In FIG. 4, the expansion dowel is similar to that shown in FIG. 3. In FIG. 4 the expansion dowel 1 is inserted into a structural member C having hollow regions or hollow spaces. As a result, the projections 7a, 7b are pressed radially outwardly into the hollow spaces in the structural members C.

The axially extending first slots 6a, 6b and second slots 5a, 5b can have different forms. For instance, the slots may be narrower or wider of different widths, corrugated in a sine-shaped manner or configured in a zig-zag manner.

While the invention has been illustrated and described as embodied in an expansion dowel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. Expansion dowel comprising an axially elongated sleeve-like expansion member having an axially extending bore therethrough and an axially elongated expansion element insertable into said expansion member bore, said expansion member and expansion element each have a leading end and a trailing end spaced apart in the axial direction, said expansion member has a pair of axially extending first slots open at the leading end and extending toward the trailing end, and a pair of axially extending second slots closed at the opposite ends thereof spaced apart in the axial direction, said second slots are offset in the circumferential direction by 90° relative to the first slots, wherein the improvement comprises that said second slots extend axially closer to the trailing end of said expansion member than said first slots, and said second slots partially overlap said first slots in the axial direction, radially displaceable projections are provided within the second slots and said projections extend radially outwardly from the outside surface of the expansion member before the expansion member is inserted into the bore hole, each said projection is pivotably displaceable above a pivot axis extending transversely of the axial direction of said expansion member, the pivot axes are arranged in the end region of the second slots closer to the leading end of the expansion member, and said second slots have a first width extending transversely of the axial direction closer to the trailing end of the expansion member and a second width greater than the first width located closer to the leading end of the expansion member and the second width sections contain said projections and said projections have a width transversely of the axial direction smaller than the width of the second section.

2. Expansion dowel, as set forth in claim 1, wherein the axial extent of the overlap is in the range of 0.3 to 1 times the axial length of the second slots.

3. Expansion dowel, as set forth in claim 1, wherein the pivot axes extend perpendicularly of the axis of the expansion member.

4. Expansion dowel, as set forth in claim 1, wherein the second sections of the second slots are located in the axial length thereof overlapping the first slots.

* * * * *